(12) United States Patent
Zhao

(10) Patent No.: US 12,044,243 B1
(45) Date of Patent: Jul. 23, 2024

(54) AIR PUMP

(71) Applicant: Dongguan Hongyu Plastic Co., Ltd., Guangdong (CN)

(72) Inventor: Pan Zhao, Guangdong (CN)

(73) Assignee: Dongguan Hongyu Plastic Co., Ltd., Guangdong (CN)

( * ) Notice: Subject to any disclaimer, the term of this patent is extended or adjusted under 35 U.S.C. 154(b) by 0 days.

(21) Appl. No.: 18/624,197

(22) Filed: Apr. 2, 2024

(30) Foreign Application Priority Data

Nov. 21, 2023 (CN) .......................... 202323150103.X

(51) Int. Cl.
| | |
|---|---|
| *F04D 25/06* | (2006.01) |
| *F04D 27/00* | (2006.01) |
| *F04D 29/42* | (2006.01) |
| *A47C 27/08* | (2006.01) |
| *H02K 11/33* | (2016.01) |

(52) U.S. Cl.
CPC ......... *F04D 25/068* (2013.01); *F04D 27/008* (2013.01); *F04D 29/4226* (2013.01); *A47C 27/082* (2013.01); *H02K 11/33* (2016.01)

(58) Field of Classification Search
CPC ... A47C 27/082; F04D 25/068; F04D 27/008; F04D 29/4226; H01H 5/06; H02K 11/28
USPC ....................................................... 310/68 A
See application file for complete search history.

(56) References Cited

U.S. PATENT DOCUMENTS

| | | | |
|---|---|---|---|
| 10,570,911 B2 * | 2/2020 | Lau .................... | F04D 25/084 |
| 2002/0194678 A1 * | 12/2002 | Chung ................ | A47C 27/082 |
| | | | 5/713 |
| 2010/0247355 A1 * | 9/2010 | Pan .................... | F04D 25/084 |
| | | | 417/423.14 |
| 2011/0011465 A1 * | 1/2011 | Wang .................. | F16K 31/42 |
| | | | 137/224 |
| 2012/0107153 A1 * | 5/2012 | Liu ..................... | F04D 25/084 |
| | | | 417/410.1 |

* cited by examiner

*Primary Examiner* — Devon C Kramer
*Assistant Examiner* — Joseph S. Herrmann
(74) *Attorney, Agent, or Firm* — Cooper Legal Group, LLC

(57) ABSTRACT

Disclosed is an air pimp, including a housing mechanism, a fan assembly, and an adjusting mechanism. The housing mechanism includes a bottom housing and a cover plate. The cover plate covers the bottom housing; the cover plate is provided with a first air port and a vent cap. The vent cap is rotatably connected with the cover plate; the bottom housing is provided with a second air port. The fan assembly is arranged in an accommodating space. The adjusting mechanism is arranged on the vent cap. The adjusting mechanism includes a fixture block movably passes through the vent cap and a first driving component; the cover plate is provided with a first fixture slot, a second fixture slot, and a third fixture slot. The first driving component may drive the fixture block to be clamped into the first fixture slot, the second fixture slot or the third fixture slot.

9 Claims, 5 Drawing Sheets

AIR PUMP

CROSS-REFERENCE TO RELATED APPLICATION

The present application claims the priority benefit of China application No. 202323150103.X filed on Nov. 21, 2023. The entirety of China application No. 202323150103.X is incorporated herein by reference and made a part of this specification.

TECHNICAL FIELD

The present application relates to the field of inflation equipment, and in particular to an air pimp.

BACKGROUND

The inflatable products on the market, such as inflatable beds, inflatable desks, inflatable boats, inflatable toys, etc., are favored broadly by the consumers due to their advantages of light weight, foldability, good portability, and good comfort, which have an extremely wide range of applications and have become one of the essential products for people to stay at home and travel, with high market prospects.

In related technologies, the air pump is a device configured for the inflation and deflation of the inflatable products, which is usually used in conjunction with inflatable products. In the air pump, the intake airflow and the exhaust airflow is generally formed by the rotation of the fan driven by the motor. At the meanwhile, the air pump is provided with a knob switch configured for control of intake and outgassing. After the connection between the air pump and the inflatable product, the user rotates the knob switch to adjust it to the position that the air pump is operated to inflate the inflatable product, so as to apply the inflation operation to the inflatable product. And the user rotates the knob switch to adjust it to the position that the air pump is operated to deflate the inflatable product, so as to apply the deflation operation to the inflatable product.

Since the air pumps are prone to vibration because of the rotation of the fan driven by the motor, the vibration of the air pump causes the easy deviation of the knob switch from the position of inflation operation or deflation operation. When the knob switch deviates from the position of inflation operation or deflation operation, the inflation operation or the deflation operation of the inflatable product is interrupted, so that the user should repeatedly adjust the position of the knob switch, which causes the complex operation and poor stability of inflation and deflation.

SUMMARY

To improve the inflation and deflation operation stability of the inflatable product, the present application provides an air pump.

The air pump provided by present application adopts the following technical solution:

An air pump, comprising:

A housing mechanism, wherein the housing mechanism comprise a bottom housing and a cover plate, the cover plate covers the bottom housing to form an accommodating space, the cover plate is provided with a first air port, the cover plate is provided with a vent cap located at the first air port, the vent cap is rotatably connected with the cover plate, and the bottom housing is provided with a second air port configured to inlet and outlet air;

A fan assembly, wherein the fan assembly is located in the accommodating space, the fan assembly comprises a fan component and a control component, the fan component is provided on the bottom housing and configured to generate airflow, the control component is electrically connected with the fan component, and the control component is provided on the cover plate and configured to control the fan component to generate intake airflow and exhaust airflow; and An adjusting mechanism, wherein the adjusting mechanism is provided on the vent cap, the adjusting mechanism comprises a fixture block and a first driving component, the fixture block movably passes through an side surface of the vent cap, the cover plate is provided with a first fixture slot, a second fixture slot, and a third fixture slot at interval on an side surface of the first air port, the first driving component is configured to drive the fixture block to snap in the first fixture slot, the second fixture slot or the third fixture slot, when the fixture block is clamped into the first fixture slot, the control component controls the fan component to generate intake airflow, when the fixture block is clamped into the second fixture slot, the control component controls the fan component to stop operation, and when the fixture block is clamped into the third fixture slot, the control component controls the fan component to generate exhaust airflow.

By adopting the above technical solution, the housing mechanism supports the fan assembly and the adjusting mechanism, the fan assembly is mounted in the accommodating space formed by the bottom housing and the cover plate, and the adjusting mechanism adjust the air pump to inflate, deflate or stop operation. When an inflation operation is needed for the inflatable object, the operator rotates the vent cap, to make the vent cap drive the fixture block to rotate. When the fixture block rotates to the position aligned with the first fixture slot, the first driving component drives the fixture block to snap in the first fixture slot, which prevents the fixture block and the vent cap from continuing to rotate. At this time, the control component controls the fan assembly to generate intake airflow, the external air enters from the second air port, and then enters to the inflatable object from the first air port to implement an inflation operation. During the inflation process, the snap of the fixture block into the first fixture slot is benefit to the improvement of stability of the air pump when inflating. When a deflation operation is needed for the inflatable object, the operator rotates the vent cap, to make the vent cap drive the fixture block to rotate. When the fixture block rotates to the position aligned with the third fixture slot, the first driving component drives the fixture block to snap in the third fixture slot, which prevents the fixture block and the vent cap from continuing rotating. At this time, the control component controls the fan assembly to generate exhaust airflow, the air in the inflatable object deflates from the first air port and flows to the external from the second air port to implement the deflation operation. During the deflation process, the snap of the fixture block into the third fixture slot is benefit to the improvement of the stability of the air pump when deflating. When the inflation and deflation operations of the air pump are not needed, the operator rotates the vent cap, to make the vent cap drive the fixture block to rotate. When the fixture block rotates to the position aligned with the second fixture slot, the first driving component drives the fixture block to snap in the second fixture block, to prevent the fixture block and the vent cap from continuing rotating, which is benefit to improvement of safety of the air pump when it is not working.

Optionally, the first driving component comprises a fixed block, a connecting rod, and a first elastic element, the fixed block is fixed on the vent cap, the connecting rod movably passes through the fixed block along the length direction of the fixed block, two ends of the connecting rod extend out of the fixed block, a first end of the first elastic element is fixed on the fixture block, the second end of the first elastic element is fixed on an end of the connecting rod toward the fixture block, and the first elastic element is always in a compressed state.

The air pump is in inflation operation when the fixture block snaps in the first fixture block, the air pump stops working when the fixture block snaps in the second fixture block, and the air pump is in deflation operation when the fixture block snaps in the third fixture block. At the time when the working mode of the air pump is needed to be adjusted, by pulling the connecting rod, the user can do a pull-out of the fixture block from the first fixture slot, the second fixture slot or the third fixture slot to relieves the fixation of snap connection between the vent cap and the cover plate, which enable the vent cap and the fixture block to continue to rotate. Then the user is able to re-select the first fixture slot, the second fixture slot or the third fixture slot for the fixture block to snap, which makes an effect in adjusting the working mode of the air pump. When the working mode of the air pump is selected, the user loses the connecting rod, which makes the first elastic element push the fixture block into the fixture slot to implement the fixation of the snap connection between the vent cap and the cover plate again.

Optionally, the adjusting mechanism further comprises a reset component configured to drive the fixture block to move towards the direction close to the second fixture slot, and the reset component is located at a side of the vent cap away from the fixture block.

By adopting the above technical solution, when the fixture block in located at the position between the third fixture slot and the second fixture slot, the reset component drives the fixture block to move towards the direction close to the second fixture slot, to make the fixture block snap into the second fixture slot, which is benefit to improvement of safety when the air pump is not needed to be used.

Optionally, the reset component comprises a first fixed rod, a second fixed rod, a second elastic element, and a third elastic element, the first fixed rod and the second fixed rod are fixed on the cover plate, the first fixed rod is provided on a first side of the fixed block, the second fixed rod is provided on a second side of the fixed block opposite to the first side, an end of the fixed block away from the fixture block extends out of the side surface of the vent cap, a first end of the second elastic element and a first end of the third elastic element are fixed on an end of the fixed block away from the fixture block, a second end of the second elastic element is fixed on the first fixed rod, a second end of the third elastic element is fixed on the second fixed rod, and when the fixture block is clamped into the second fixture slot, the second elastic element and the third elastic element are in a normal state.

By adopting the above technical solution, when the fixture block is clamped into the second fixture slot, the second elastic element and the third elastic element are in a normal state. When the air pump is not needed to work, in the state that the fixture block is located at the position between the second fixture slot and the first fixture slot, the second elastic element is in stretched state, the restoring force of the second elastic can pull the fixture block to move towards the direction close to the second fixture slot, so as to prevent the fixture block from moving towards the direction close to the first fixture slot and snapping into the first fixture slot. In the state that the fixture block is located at the position between the second fixture slot and the third fixture slot, the third elastic element is in stretched state, the restoring force of the third elastic can pull the fixture block to move towards the direction close to the second fixture slot, so as to prevent the fixture block from moving towards the direction close to the third fixture slot and snapping into the third fixture slot, which achieves the effect of improving safety.

Optionally, a quantity of the connecting rod is two, and two connecting rods are in parallel.

By adopting the above technical solution, that the quantity of the connecting rod is two is benefit to improve the stability when the connecting rod drives the fixture block to move.

Optionally, the bottom housing is provided with a division plate, the division plate is fixed in the bottom housing and divides the accommodating space into a second accommodating cavity and a first accommodating cavity configured to accommodate the fan assembly, the cover plate comprises a first upper cover and a second upper cover, the first upper cover is configured to seal the first accommodating cavity, and the second upper cover is rotatably connected to the bottom housing and configured to seal the second accommodating cavity.

By adopting the above technical solution, the first accommodating cavity accommodates the fan assembly, the second accommodating cavity accommodates a power line, and the division plate separates the fan assembly and the power line, so as to be benefit to prevent the power line from being affected when the fan assembly is working. The sealing from the first upper cover to the first accommodating cavity is benefit to improve the airtightness when airflow is generated. The rotatable connection of the second upper cover to the bottom housing is benefit to improve the convenience to the users when using the power line.

Optionally, the fan component comprises a mounting base, a fan blade and a driving motor, the mounting base located in the first accommodating cavity is fixed on the bottom housing, the mounting base is provided with a vent channel, a first end of the vent channel located on the second air port communicates with external, a second end of the vent channel located on the first air port communicates with the vent cap, the driving motor is fixed on the mounting base, the fan blade is fixed on an output shaft of the driving motor, and the driving motor is electrically connected to the control component.

By adopting the above technical solution, the mounting base supports the driving motor and the fan blade, and the control component is electrically connected with the driving motor to implement the control to the start, stop and rotation direction of the driving motor. By controlling the start, stop and rotation direction of the driving motor, the adjustment to start, stop, inflation mode, and deflation mode of the air pump is implemented. When the driving motor is power on, an output shaft of the driving motor drives the fan blade to rotate, so as to generate intake airflow and exhaust airflow in the vent channel. When the driving motor is power off, the air pump stops working.

Optionally, the control component comprises a PCB, the PCB is fixed on the first upper cover, the PCB is electrically connected to the fan component, the PCB has a first trigger mode, a second trigger mode, and a third trigger mode, when the fixture block is clamped into the first fixture slot, the PCB is triggered to the first trigger mode, and the PCB outputs electrical signal to the fan component so that the fan component generates intake airflow, when the fixture block is clamped into the second fixture slot, the PCB is triggered to the second trigger mode, and the PCB outputs electrical signal to the fan component so that the fan component stops working, when the fixture block is clamped into the third fixture slot, the PCB outputs electrical signal to the fan component so that the fan component generates exhaust airflow.

By adopting the above technical solution, when the fixture block is clamped into the first fixture slot, the PCB is triggered to the first trigger mode, the PCB outputs electrical signal to the fan assembly to make the fan assembly generate intake airflow in the vent channel. The external air enters from the second air port to the vent channel, and flows into the inflatable object from the first air port to implement inflation operation. When the fixture block is clamped into the second fixture slot, the PCB is triggered to the second trigger mode, the PCB outputs electrical signal to the fan assembly to make the fan assembly stop operation. When the fixture block is clamped into the third fixture slot, the PCB is triggered to the third trigger mode, the PCB outputs electrical signal to the fan assembly to make the fan assembly generate exhaust airflow in the vent channel. The air in the inflatable object enters to the vent channel from the first air port, and flows to external from the second air port to implement the deflation operation of the inflatable object.

Optionally, the first upper cover is provided with an air pressure detector configured to detect the pressure of the inflatable object.

By adopting the above technical solution, the air pressure detector detects the pressure of the inflatable object, so that the users can be directly informed the pressure status of the inflatable object, which is convenient to the users for the inflation and deflation operation of the inflatable object.

In summary, the present application includes at least one of the following beneficial technical effects:

1. By providing the fixture block and the first driving component, when an inflation operation is needed for the inflatable object, the operator rotates the vent cap, to make the vent cap drive the fixture block to rotate. When the fixture block rotates to the position aligned with the first fixture slot, the first driving component drives the fixture block to snap in the first fixture slot, which prevents the fixture block and the vent cap from continuing to rotate. At this time, the control component controls the fan assembly to generate intake airflow, the external air enters from the second air port, and then enters to the inflatable object from the first air port to implement an inflation operation. During the inflation process, the snap of the fixture block into the first fixture slot is benefit to the improvement of stability of the air pump when inflating. When a deflation operation is needed for the inflatable object, the operator rotates the vent cap, to make the vent cap drive the fixture block to rotate. When the fixture block rotates to the position aligned with the third fixture slot, the first driving component drives the fixture block to snap in the third fixture slot, which prevents the fixture block and the vent cap from continuing to rotate. At this time, the control component controls the fan assembly to generate exhaust airflow, the air in the inflatable object deflates from the first air port and flows to the external from the second air port to implement the deflation operation. During the deflation process, the snap of the fixture block into the third fixture slot is benefit to the improvement of the stability of the air pump when deflating. When the inflation and deflation operations of the air pump are not needed, the operator rotates the vent cap, to make the vent cap drive the fixture block to rotate. When the fixture block rotates to the position aligned with the second fixture slot, the first driving component drives the fixture block to snap in the second fixture block, to prevent the fixture block and the vent cap from continuing rotating, which is benefit to improvement of safety of the air pump when it is not working.

2. By providing the fixed block, the connecting rod and the first elastic element, the air pump is in inflation operation when the fixture block snaps in the first fixture block, the air pump stops working when the fixture block snaps in the second fixture block, and the air pump is in deflation operation when the fixture block snaps in the third fixture block. At the time when the working mode of the air pump is needed to be adjusted, by pulling the connecting rod, the user can do a pull-out of the fixture block from the first fixture slot, the second fixture slot or the third fixture slot to relieves the fixation of snap connection between the vent cap and the cover plate, which enable the vent cap and the fixture block to continue to rotate. Then the user is able to re-select the first fixture slot, the second fixture slot or the third fixture slot for the fixture block to snap, which makes an effect in adjusting the working mode of the air pump. When the working mode of the air pump is selected, the user loses the connecting rod, which makes the first elastic element push the fixture block into the fixture slot to implement the fixation of the snap connection between the vent cap and the cover plate again.

3. By providing the first fixed rod, the second fixed rod, the second elastic element and the third elastic element, when the fixture block is clamped into the second fixture slot, the second elastic element and the third elastic element are in a normal state. When the air pump is not needed to work, in the state that the fixture block is located at the position between the second fixture slot and the first fixture slot, the second elastic element is in stretched state, the restoring force of the second elastic can pull the fixture block to move towards the direction close to the second fixture slot, so as to prevent the fixture block from moving towards the direction close to the first fixture slot and snapping into the first fixture slot. In the state that the fixture block is located at the position between the second fixture slot and the third fixture slot, the third elastic element is in stretched state, the restoring force of the third elastic can pull the fixture block to move towards the direction close to the second fixture slot, so as to prevent the fixture block from moving towards the direction close to the third fixture slot and snapping into the third fixture slot, which achieves the effect of improving safety.

DESCRIPTION OF THE EMBODIMENTS

The present application will be further described in detail in combination with FIG. 1-8.

Embodiment 1

Figure 1:
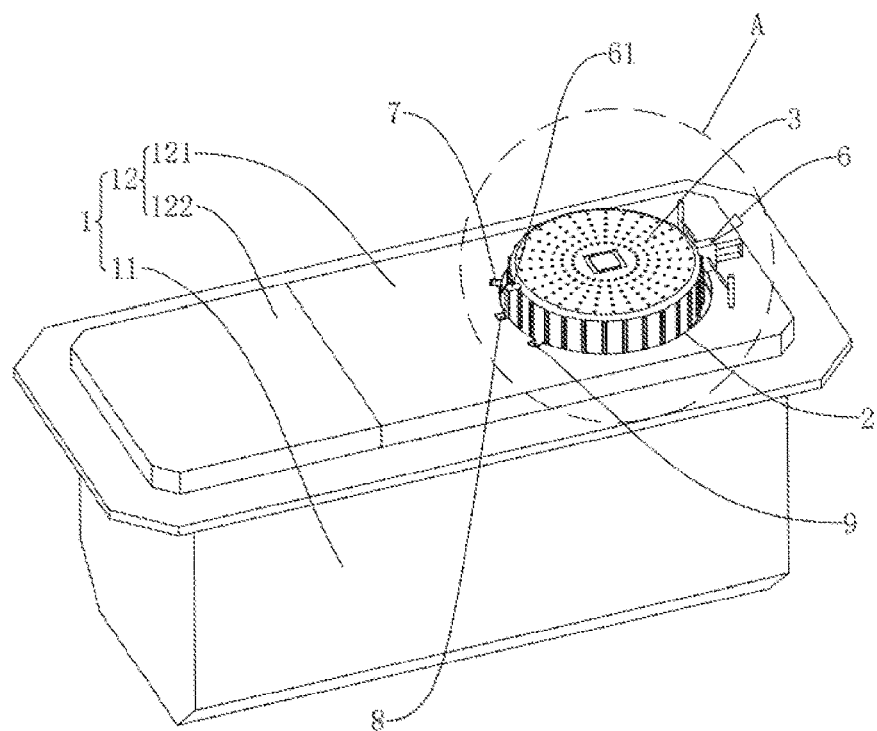
FIG. 1 is an overall structure schematic diagram of the air pump in embodiment 1 of the present application.
Figure 2:
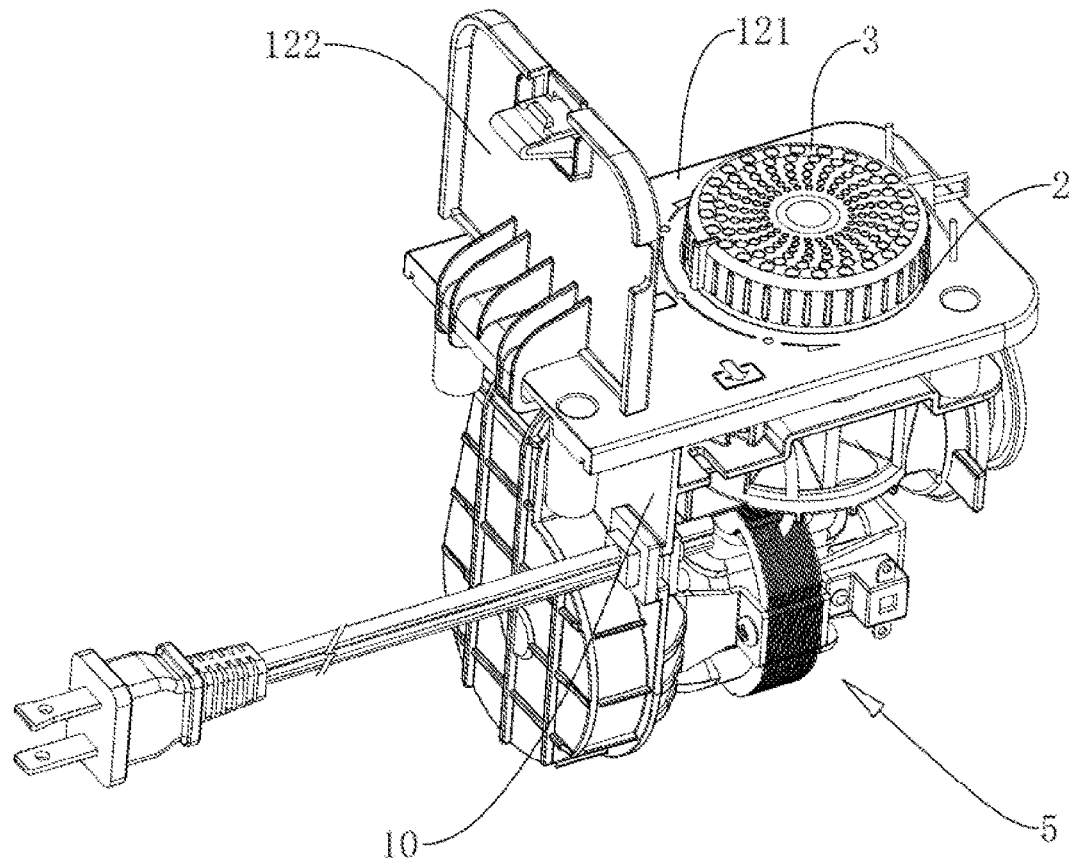
FIG. 2 is a structure schematic diagram of the fan assembly in embodiment 1 of the present application.
Figure 3:
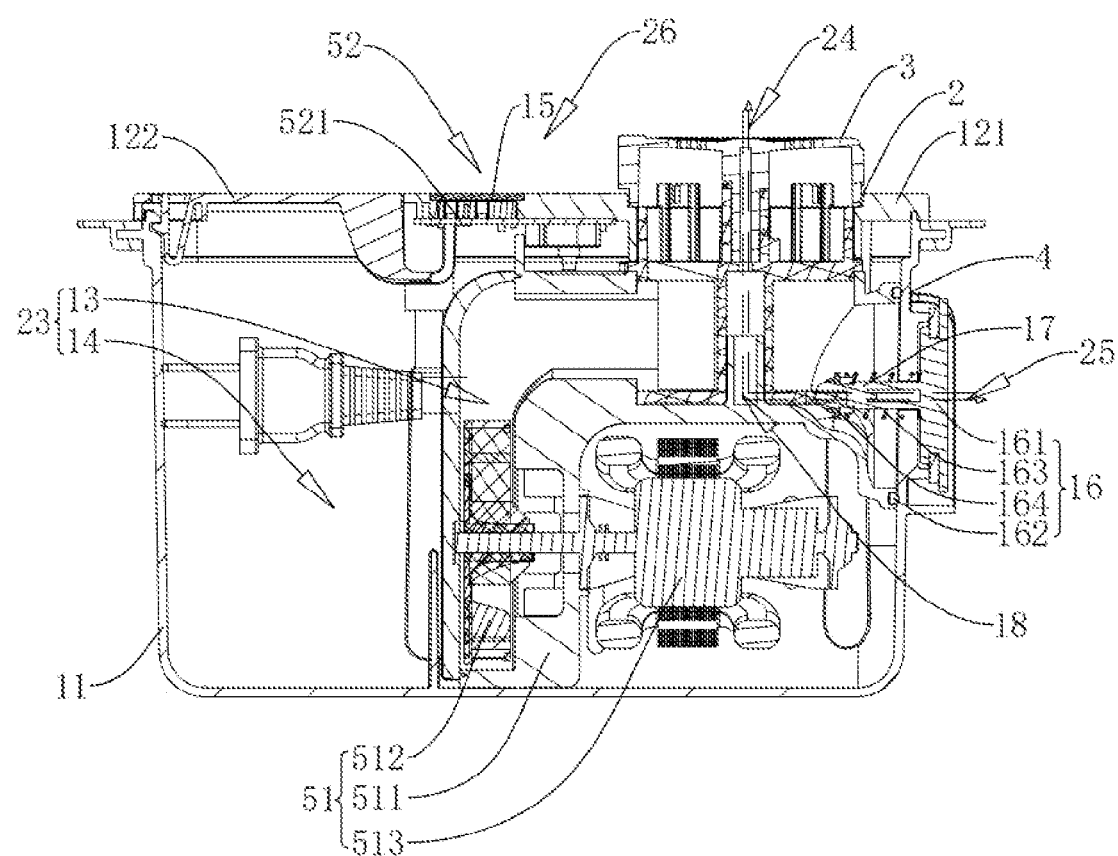
FIG. 3 is a vertical sectional view of the air pump in embodiment 1 of the present application.

The embodiment 1 of present application discloses an air pump, referring to FIG. 1 and FIG. 2, including a housing mechanism 1, a fan assembly 5, and an adjusting mechanism 6, the housing mechanism 1 supports the fan assembly 5 and the adjusting mechanism. Referring to FIG. 3, the fan assembly 5 is configured to generate intake airflow 24 or exhaust airflow 25. The adjusting mechanism 6 is configured to control the power-on and power-off of the fan assembly 5 as well as the airflow generated after the power-on of the fan assembly 5.

Referring to FIG. 1 and FIG. 3, the housing mechanism 1 includes a bottom housing 11 and a cover plate 12. The cover plate 12 covers the bottom housing 11 to form an accommodating space 23. Referring to FIG. 2, the fan assembly 5 is provided in the accommodating space 23. Referring to FIG. 3, the bottom housing 11 is vertically provided with a division plate 10. The division plate is fixedly provided in the inner of the bottom housing 11 to divide the accommodating space 23 into a first accommodating cavity 13 configured to accommodate the fan assembly 5 and a second accommodating cavity 14 configured to accommodate power line. When the air pump is needed to be used, the user takes out the power line from the second accommodating cavity 14 for connecting to an external power supply. When the air pump is not needed to be used, the user places the power line into the second accommodating cavity 14, to conveniently store the power line. It should be illustrated that, the cover plate 12 includes a first upper cover 121 and a second upper cover 122. The first upper cover 121 is configured to seal the first accommodating cavity 13, which forms a closed environment for the fan assembly 5. The second upper cover is in rotatable connection with the bottom housing 11 for sealing the second accommodating cavity 14, which is convenient for placing and picking the power line.

Referring to FIG. 1 and FIG. 3, the cover plate 12 is provided with a first air port 2. In present embodiment, the first air port is provided on the first upper cover 121. At the same time, the position of the first upper cover 121 located at the first air port 2 is provided with a vent cap 3 configured to communicate with the inflatable object. The shape of the vent cap 3 is set as a cylindrical shape. The vent cap 3 is provided with several breathing holes configured for inflation and deflation. The vent cap 3 is rotatably connected with the first upper cover 121. The vent cap 3 and the fan assembly 5 are in combination for selecting a needed working mode of the air pump. The bottom housing 11 is provided with a second air port 4 configured to inlet and outlet air. The fan assembly 5 is provided with a vent channel 18. A first end of the vent channel 18 located at the first air port 2 communicates with the vent cap 3, and a second end of the vent channel 18 located at the second air port 4 communicates with external. When the fan assembly 5 is working, airflow is generated in the vent channel 18 to operate inflation and deflation of the inflatable object.

Referring to FIG. 2 and FIG. 3, the fan assembly 5 includes a fan component 51 and a control component 52. The fan component 51 is provided on the bottom housing 11 for generating airflow. The control component 52 is electrically connected with the fan component 51. The control component 52, which is provided on the first upper cover 121, cooperates with the position where the vent cap 3 rotates to, for controlling the fan component 51 to generate intake airflow 24 and exhaust airflow 25.

Figure 4:
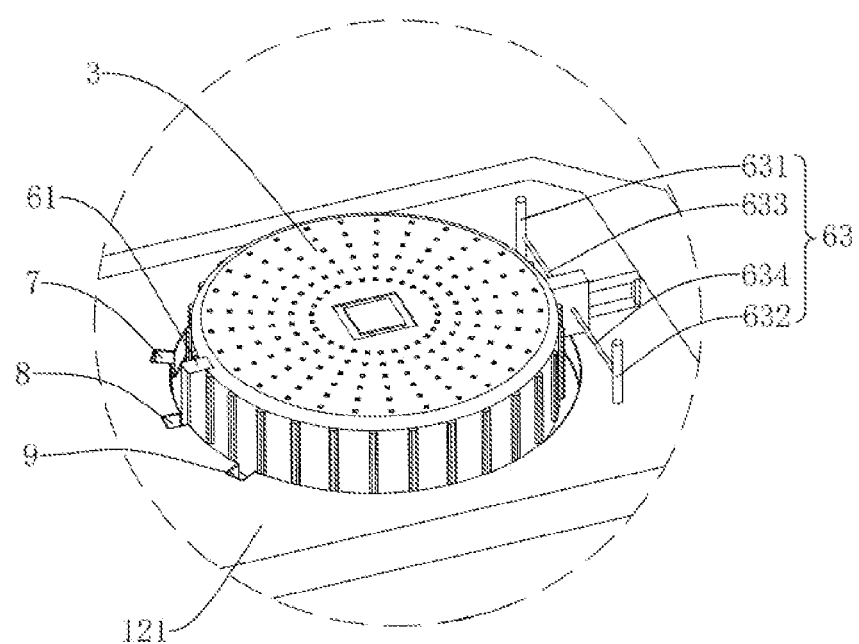
FIG. 4 is an enlarged view of part A in FIG. 1.

Referring to FIG. 1, the adjusting mechanism 6 is provided on the vent cap 3. Referring to FIG. 4, the adjusting mechanism includes a fixture block 61 and a first driving component 62. The fixture block 61 movably passes through an side surface of the vent cap 3 to move radially, and the fixture block 61 moves along with the rotation of the vent cap 3. At the same time, the first upper cover 121 is provided with a first fixture slot 7, a second fixture slot 8 and a third fixture slot 9 at interval on an side surface of the first air port 2. When the vent cap 3 rotates to the position that the fixture block 61 is aligned with the first fixture slot 7, the first driving component 62 drives the fixture block 61 to snap into the first fixture slot 7. When the vent cap 3 rotates to the position that the fixture block 61 is aligned with the second fixture slot 8, the first driving component 62 drives the fixture block 61 to snap into the second fixture slot 8. When the vent cap 3 rotates to the position that the fixture block 61 is aligned with the third fixture slot 9, the first driving component 62 drives the fixture block 61 to snap into the third fixture slot 9. It should be illustrated that, when the fixture block 61 is clamped into the first fixture slot 7, the control component 52 controls the fan component 51 to generate intake airflow 24. When the fixture block 61 is clamped into the second fixture slot 8, the control component 52 controls the fan component 51 to stop operation. And when the fixture block 61 is clamped into the third fixture slot 9, the control component 52 controls the fan component 51 to generate exhaust airflow 25.

Referring to FIG. 3 and FIG. 4, the control component 52 includes a PCB 521. The PCB is horizontally in fixation connection with a lower panel surface of the first upper cover 121, so as to make the PCB board 521 being located in the first accommodating cavity 13. The PCB 521 is electrically connected with the fan component 51. The PCB 521 has a first trigger mode, a second trigger mode, and a third trigger mode. When the fixture block 61 is clamped into the first fixture slot 7, the fixture block 61 and the PCB 521 are in a first kind of connection, so that the PCB 521 is triggered to the first trigger mode, and the PCB 521 outputs electrical signal to the fan component 51 to make the fan component 51 generate intake airflow 24. The intake airflow 24 flows into the inflatable object from external to implement the inflation operation. When the fixture block 61 is clamped into the second fixture slot 8, the fixture block 61 and the PCB 521 are in a second kind of connection, so that the PCB 521 is triggered to the second trigger mode, and the PCB 521 outputs electrical signal to the fan component 51 to make the fan component 51 stop operation. When the fixture block 61 is clamped into the third fixture slot 9, the fixture block 61 and the PCB 521 are in a third kind of connection, so that the PCB 521 outputs electrical signal to the fan component 51 to make the fan component 51 generate exhaust airflow 25. The exhaust airflow 25 flows from the inflatable object to external to implement deflation operation.

Figure 5:
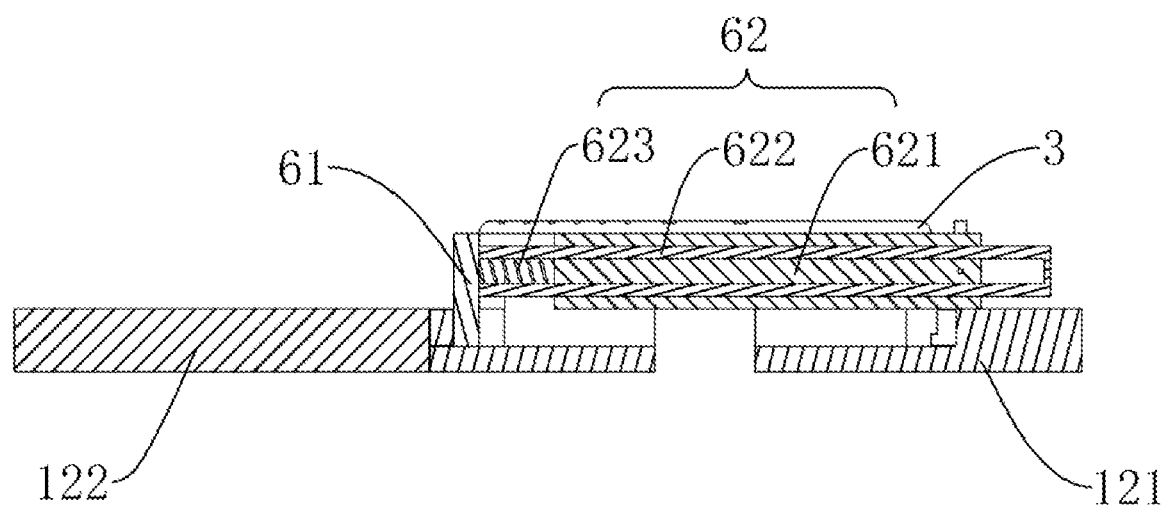
FIG. 5 is a sectional view of the first driving component in embodiment 1 of the present application.

Referring to FIG. 5, the first driving component 62 includes a fixed block 621, a connecting rod 622 and a first elastic element 623. The fixed block 621 is set as a long strip shape. The fixed block 621 is fixed on the vent cap 3. The fixed block 621 is perpendicular to an axis of vent cap 3 and passes through the axis of vent cap 3. The connecting rod 622 movably pass through the fixed block 621 along with the length direction of the fixed block 621. And two ends of the connecting rod 622 extend out of the fixed block 621, in which a first end of the connecting rod 622 towards to the fixture block 61. A first end of the first elastic element 623 is in fixation connection with a side wall of the fixture block 61, a second end of the first elastic element 623 is in fixation connection with an end of the fixed block 621 facing towards the fixture block 61, and the first elastic element 623 is always in a compressed state. The first elastic element 623 tends to push the fixture block 61 away from the fixed block 621. In present embodiment, a quantity of the connecting rod is two. The first elastic element 623 is provided as a first spring. Two connecting rods 622 are provided in parallel. And two connecting rods 622 are separately provided at upper and lower sides of the first spring, so as to improve the stability when the connecting rod 622 drives the fixture block 61 to move.

Referring to FIG. 1 and FIG. 4, the adjusting mechanism 6 further includes a reset component 63 configured to drive the fixture block 61 to move towards to the direction closed to the second fixture slot 8. The reset component 63 is located at a side of the vent cap 3 away from the fixture block 61. Particularly, the reset component 63 includes a first fixed rod 631, a second fixed rod 632, a second elastic element 633 and a third elastic element 634. The first fixed rod 631 and the second fixed rod 632 are vertically fixed on an upper panel surface of the first upper cover 121, the first fixed rod 631 is provided on a first side of the fixture block 61, and the second fixed rod 632 is provided on a second side of the fixed block 621 opposite to the first side. An end of the fixed block 621 away from the fixture block 61 extends out of the side surface of the vent cap 3, a first end of the second elastic element 633 and a first end of the third elastic element 634 are fixed on an end of the fixed block 621 away from the fixture block 61, a second end of the second elastic element 633 is fixed on the first fixed rod 631, a second end of the third elastic element 634 is fixed on the second fixed rod 632. When the fixture block 61 is clamped into the second fixture slot 8, the second elastic element 633 and the third elastic element 634 are in a normal state. In present embodiment, the second elastic element 633 is provided as a first elastic cord, and the third elastic element 634 is provided as a second elastic cord.

When the fixture block 61 is located at the position between the first fixture slot 7 and the second fixture slot 8, the first elastic cord is in a stretched state. The restoring force of the first elastic cord pushes the connecting rod 622 to rotate so that the fixture block 61 moves to the position that is aligned with the second fixture slot 8, then the restoring force of the first spring pushes the fixture block 61 to snap into the second fixture slot 8 to implement the fixation of the fixture block 61. When the fixture block 61 is located at the position between the third fixture slot 9 and the second fixture slot 8, the second elastic cord is in a stretched state. The restoring force of the second elastic cord pushes the connecting rod 622 to rotate so that the fixture block 61 moves to the position that is aligned with the second fixture slot 8. Then, the restoring force of the first spring pushes the fixture block 61 to snap into the second fixture slot 8 to implement the fixation of the fixture block 61, which is benefit to improve safety.

Figure 6:
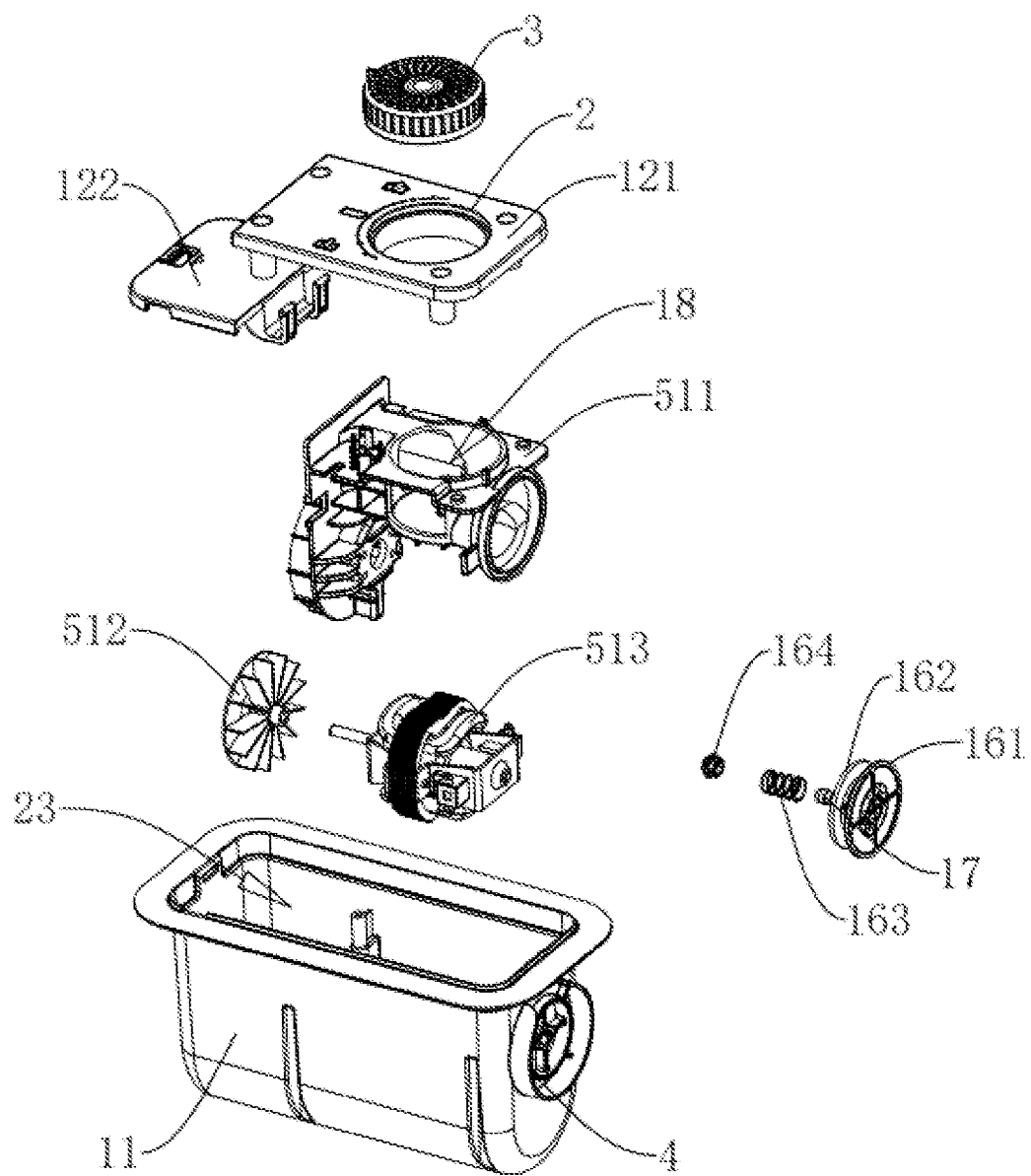
FIG. 6 is an exploded view of the air pump in embodiment 1 of the present application.

Referring to FIG. 3 and FIG. 6, the fan component 51 includes a mounting base 511, a fan blade 512, and a driving motor 513. The mounting base 511 is located in the first accommodating cavity 13 and fixed on the bottom housing 11. The vent channel 18 is provided on the mounting base 511. A first end of the vent channel 18 located at the position of the second air port 4 communicates with external, a second end of the vent channel 18 located at the position of the first air port 2 communicate with the vent cap 3. The driving motor 513 is fixed on the mounting base 511, the fan blade 512 is in fixation connection with an output shaft of the driving motor 513, and the driving motor is electrically connected with the PCB 521.

Referring to FIG. 3 and FIG. 6, the second air port 4 is provided with a sealing component 16 configured for improving sealing performance. In particular, the sealing component includes a blanking cap 161, a sealing ring 162, a second spring 163 and a spring cap 164. The blanking cap 161 is fixed on the position of the bottom housing 11 located at the second air port 4. The blanking cap 161 is provided with a transmission rod 17 along with a center axis of the blanking cap 161. The blanking cap 161 is in cooperation with and connected to the vent cap 3 through the transmission rod 17, so that the function of changing the working mode of the air pump by rotating the vent cap 3 is implemented. The second spring 163 is sheathed on the transmission rod 17, the spring cap 164 is in fixed on an end of the transmission rod 17 away from the blanking cap 161, so as to limit the second spring 163.

Referring to FIG. 3, the first upper cover 121 is provided with an air pressure detector 26 configured to detect the pressure in the inflatable object. The air pressure detector 26 includes an air pressure display screen 15, the air pressure display screen 15 is fixed in the PCB 521, and the air pressure display screen 15 is embedded on the first upper cover 121, which make the air pressure display screen 15 flush with the first upper cover 121. The air pressure display screen 15 can display the pressure in the inflatable object, so that the users can visually see the pressure of the inflatable object, which is convenient for inflation and deflation operation to the inflatable object.

The implementation principle of the air pump in embodiment 1 of present application is that: when the fixture block 61 is clamped into the second fixture slot 8, the fixture block 61 and the PCB 521 are in a second kind of connection, so that the PCB 521 is triggered to the second trigger mode, and the PCB 521 outputs electrical signal to the fan component 51 to make the fan component 51 stop operation. When a inflation operation is needed for the inflatable object, the user pulls the connecting rod 622 to drive the fixture block 61 to pull out from the second fixture slot 8. Then the user rotates the connecting rod 622 to drive the vent cap 3 to move, and the vent cap 3 rotates to drive the fixture block 61 to move to the position aligned with the first fixture slot 7. And then the user loses the connecting rod 622, the restoring force of the first spring pushes the fixture block 61 into the first fixture slot to implement the snap connection. At this time, the fixture block 61 and the PCB 521 are in the first kind of connection to make the PCB 521 be triggered to the first trigger mode, the PCB outputs electrical signal to the fan component so that the fan component generates intake airflow, so as to operate to inflate the inflatable object. When a deflation operation is needed for the inflatable object, the above operation is repeated to snap the fixture block 61 into the third fixture slot 9. The fixture block 61 and the PCB 521 are in the third kind of connection to make the PCB 521 be triggered to the third trigger mode, the PCB 521 outputs electrical signal to the driving motor 513 for generating exhaust airflow 25 in the vent channel 18, so as to operate a deflation for the inflatable object. During the working process of the air pump, the fixture block 61 is clamped into the first fixture slot 7, the second fixture slot 8, or the third fixture slot, which prevents the vent cap 3 from rotating, so as to improve the stability when the air pump is working.

Embodiment 2

Figure 7:
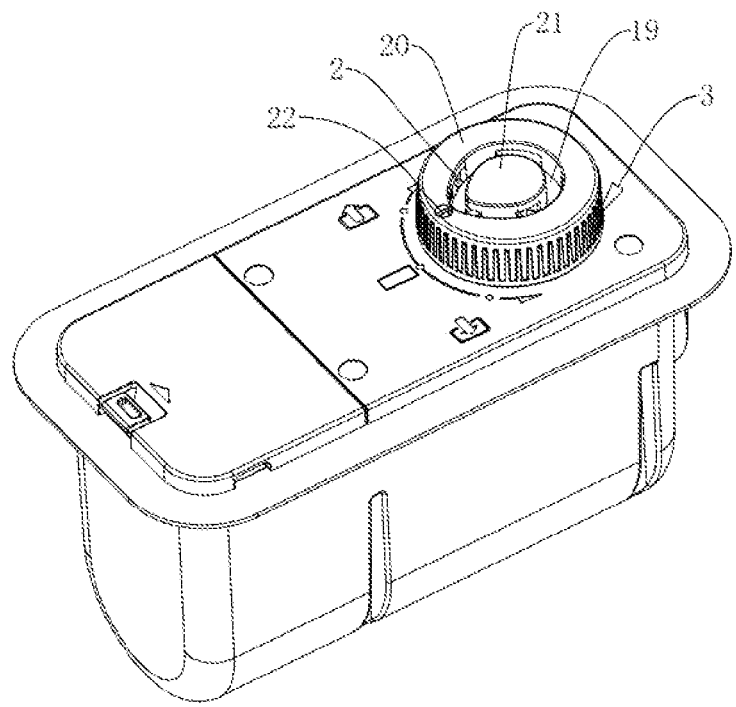
FIG. 7 is a structure schematic diagram of the air pump in embodiment 2 of the present application.

Referring to FIG. 7, the difference from embodiment 1 is that, in present embodiment, an upper part of the vent cap 3 is provided with a water-drop shape groove 19 which is in annular shape. The water-drop shape groove 19 communicates with the first air port 2, and the water-drop shape groove 19 divides the vent cap 3 into a hiding part 20 located at periphery and an indication part 21 located at the center. The hiding part 20 surrounds and covers the first air port 2, for hiding the first air port 2. The surface of the indication part 21 is flat, to make the vent cap 3 concise and intuitive. In other embodiment, the center position of the indication part 21 protrudes upwards or indents downwards, which increases the three-dimensional sense of the vent cap 3, so as to improve the aesthetics.

At the same time, the water-drop shape groove 19 has a pointed end, which makes the indication part 21 also has a pointed end. The pointed end of the indication part 21 is convenient for user to identify the working mode of the air pump. Furthermore, a position of the hiding part 20 aligned with the pointed end of the water-drop shape groove 19 is provided with a pointer 22, which further improves the user's identification of the working mode of the air pump. In other embodiment, the pointer 22 is able to be provided on the pointed end of the indication part 21.

The implementation principle of the air pump in embodiment 2 of present application is roughly the same as that in embodiment 1, which will not be elaborated again.

Embodiment 3

Figure 8:
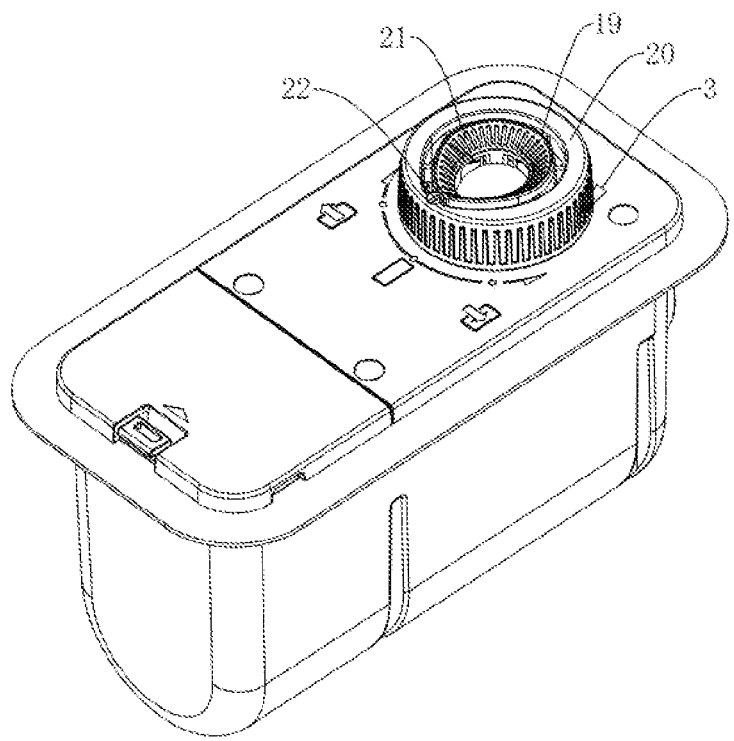
FIG. 8 is a structure schematic diagram of the air pump in embodiment 3 of the present application.

Referring to FIG. 8, the difference from embodiment 2 is that, in present embodiment, the center position of the indication part 21 is provided as a flat plane. The peripheral positions of the indication part 21 is provided as a circular inclined plane, which makes indication part 21 appear a sunken platform shape, which increases the three-dimensional sense of the vent cap 3, so as to improve the aesthetics.

The implementation principle of the air pump in embodiment 3 of present application is roughly the same as that in embodiment 1, which will not be elaborated again.

The above description is only alternative embodiment of the present application and is not intended to limit the protection scope of the present application. Therefore, any equivalent variations made according to the structures, shapes and principles of the present application, should fall within the protection scope of the present application.

LIST OF REFERENCE SIGNS 1. housing mechanism;
11. bottom housing;
12. cover plate;
121. first upper cover;
122. second upper cover;
2. first air port;
3. vent cap;
4. second air port;
5. fan assembly;
51. fan component;
511. mounting base;
512. fan blade;
513. driving motor;
52. control component;
521. PCB;
6. adjusting mechanism;
61. fixture block;
62. first driving component;
621. fixed block;
622. connecting rod;
623. first elastic element;
63. reset component;
631. first fixed rod;
632. second fixed rod;
633. second elastic element;
634. third elastic element;
7. first fixture slot;
8. second fixture slot;
9. third fixture slot;
10. division plate;
13. first accommodating cavity;
14. second accommodating cavity;
15. air pressure display screen;
16. sealing component;
161. blanking cap;
162. sealing ring;
163. second spring;
164. spring cap;
17. transmission rod;
18. vent channel;
19. water-drop shape groove;
20. hiding part;
21. indication part;
22. pointer;
23. accommodating space;
24. intake airflow;
25. exhaust airflow;
26. air pressure detector

What is claimed is:

1. An air pump, comprising:
a housing mechanism, wherein the housing mechanism comprises a bottom housing and a cover plate, the cover plate covers the bottom housing to form an accommodating space, the cover plate is provided with a first air port, the cover plate is provided with a vent cap on the first air port, the vent cap is rotatably connected with the cover plate, and the bottom housing is provided with a second air port for inlet and outlet of air;
a fan assembly, wherein the fan assembly is arranged in the accommodating space, the fan assembly comprises a fan component and a control component, the fan component is arranged on the bottom housing and configured to generate an airflow, the control component is electrically connected with the fan component, and the control component is arranged on the cover plate and configured to control the fan component to generate an intake airflow and an exhaust airflow; and
an adjusting mechanism, wherein the adjusting mechanism is arranged on the vent cap, the adjusting mechanism comprises a fixture block and a first driving component, the fixture block movably passes through a side surface of the vent cap, the cover plate is provided with a first fixture slot, a second fixture slot, and a third fixture slot at intervals on a side surface of the first air port, the first driving component is configured to drive the fixture block to be clamped into the first fixture slot, the second fixture slot or the third fixture slot; when the fixture block is clamped into the first fixture slot, the control component controls the fan component to generate the intake airflow; when the fixture block is clamped into the second fixture slot, the control component controls the fan component to stop operation; and when the fixture block is clamped into the third fixture slot, the control component controls the fan component to generate the exhaust airflow.

2. The air pump according to claim 1, wherein the first driving component comprises a fixed block, a connecting rod, and a first elastic element, the fixed block is fixed on the vent cap, the connecting rod movably passes through the fixed block along a length direction of the fixed block, two ends of the connecting rod extend out of the fixed block, a first end of the first elastic element is fixed on the fixture block, a second end of the first elastic element is fixed on an end of the fixed block facing the fixture block, and the first elastic element is always in a compressed state.

3. The air pump according to claim 2, wherein the adjusting mechanism further comprises a reset component configured to drive the fixture block to move towards the second fixture slot, and the reset component is arranged at a side of the vent cap away from the fixture block.

4. The air pump according to claim 3, wherein the reset component comprises a first fixed rod, a second fixed rod, a second elastic element, and a third elastic element, the first fixed rod and the second fixed rod are fixed on the cover plate, the first fixed rod is provided on a first side of the fixed block, the second fixed rod is provided on a second side of the fixed block opposite to the first side, an end of the fixed block away from the fixture block extends out of the side surface of the vent cap, a first end of the second elastic element and a first end of the third elastic element are fixed on the end of the fixed block away from the fixture block, a second end of the second elastic element is fixed on the first fixed rod, a second end of the third elastic element is fixed on the second fixed rod, and when the fixture block is clamped into the second fixture slot, the second elastic element and the third elastic element are in a normal state.

5. The air pump according to claim 2, wherein the first driving component comprises the connecting rod and a second connecting rod that are arranged in parallel.

6. The air pump according to claim 1, wherein the bottom housing is provided with a division plate, the division plate is fixed in the bottom housing and divides the accommodating space into a second accommodating cavity and a first accommodating cavity configured to accommodate the fan assembly, the cover plate comprises a first upper cover and a second upper cover, the first upper cover is configured to seal the first accommodating cavity, and the second upper cover is rotatably connected to the bottom housing and configured to seal the second accommodating cavity.

7. The air pump according to claim 6, wherein the fan component comprises a mounting base, a fan blade and a driving motor, the mounting base is arranged in the first accommodating cavity and is fixed on the bottom housing, the mounting base is provided with a vent channel, a first end of the vent channel is connected to the second air port for communicating with an outside of the air pump, a second end of the vent channel is connected to the first air port for communicating with the vent cap, the driving motor is fixed on the mounting base, the fan blade is fixed on an output shaft of the driving motor, and the driving motor is electrically connected to the control component.

8. The air pump according to claim 6, wherein the control component comprises a printed circuit board (PCB), the PCB is fixed on the first upper cover, the PCB is electrically connected to the fan component, the PCB has a first trigger mode, a second trigger mode, and a third trigger mode; when the fixture block is clamped into the first fixture slot, the PCB is triggered to the first trigger mode, and the PCB is configured to output a first electrical signal to the fan component so that the fan component generates the intake airflow; when the fixture block is clamped into the second fixture slot, the PCB is triggered to the second trigger mode, and the PCB is configured to output a second electrical signal to the fan component so that the fan component stops operating; and when the fixture block is clamped into the third fixture slot, the PCB is configured to output a third electrical signal to the fan component so that the fan component generates the exhaust airflow.

9. The air pump according to claim 6, wherein the first upper cover is provided with an air pressure detector.

* * * * *